United States Patent
Palod et al.

(10) Patent No.: US 12,099,624 B2
(45) Date of Patent: Sep. 24, 2024

(54) CONTROLLED DATA ACCESS VIA CONTAINER VISIBLE LOCATION

(71) Applicant: Microsoft Technology Licensing, LLC, Redmond, WA (US)

(72) Inventors: Swapnil Palod, Redmond, WA (US); Yan Reznikov, Vancouver (CA); Tao Wang, Bellevue, WA (US); Marco Fazio, Seattle, WA (US); Fahd Kamal Ehtesham Ahmad, Richmond (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 17/225,025

(22) Filed: Apr. 7, 2021

(65) Prior Publication Data

US 2022/0327230 A1  Oct. 13, 2022

(51) Int. Cl.
*G06F 21/62* (2013.01)
*G06F 9/455* (2018.01)

(52) U.S. Cl.
CPC ...... *G06F 21/6227* (2013.01); *G06F 9/45558* (2013.01); *G06F 2009/45583* (2013.01)

(58) Field of Classification Search
CPC ............. G06F 21/6227; G06F 9/45558; G06F 2009/45583; G06F 21/53
See application file for complete search history.

(56) References Cited

U.S. PATENT DOCUMENTS

| | | | |
|---|---|---|---|
| 9,069,952 B1 | 6/2015 | Paczkowski et al. | |
| 9,584,517 B1 | 2/2017 | Thomas et al. | |
| 9,635,041 B1 | 4/2017 | Warman et al. | |
| 10,635,605 B2 | 4/2020 | Leitao et al. | |
| 10,721,290 B2 * | 7/2020 | Gill | H04L 67/1097 |
| 10,810,055 B1 | 10/2020 | Walker | |
| 2018/0232517 A1 | 8/2018 | Roth et al. | |
| 2020/0412693 A1* | 12/2020 | Yamada | H04L 67/34 |
| 2022/0368695 A1* | 11/2022 | Upton | G06F 21/32 |

OTHER PUBLICATIONS

"AppArmor Security Profiles for Docker," Retrieved From https://web.archive.org/web/20201109221906/https:/docs.docker.com/engine/security/apparmor/, Nov. 9, 2020, 4 Pages.
(Continued)

*Primary Examiner* — Bruce S Ashley
(74) *Attorney, Agent, or Firm* — Workman Nydegger

(57) ABSTRACT

A host that runs a security component and a container such that code running within the container cannot access data and resources running on the host except through a predetermined location (e.g., a container file system folder) that is visible from within the container. The security component helps to provide this safety by facilitating input of input data to the container, and facilitating output of output data from the container. Such containers and host security components may similarly operate on multiple hosts. An overlay network may be present over multiple of such containers to thereby allow the code within containers to communicate with each other, even if the code is running on different computing systems, so long as the code is running within the overlay network.

18 Claims, 6 Drawing Sheets

(56) References Cited

OTHER PUBLICATIONS

"Detonation Chambers (SC-44)", Retrieved From https://cyuber.co.uk/security-controls/system-communications-protection-sc/detonation-chambers/, Retrieved on Nov. 26, 2020, 2 Pages.

"Networking with Overlay Networks", Retrieved From https://web.archive.org/web/20201109210438/https://docs.docker.com/network/network-tutorial-overlay/, Nov. 9, 2020, 15 Pages.

Bahl, Victor, "High Performance Container Networking", Retrieved From https://www.microsoft.com/en-us/research/blog/high-performance-container-networking/, Feb. 26, 2019, 9 Pages.

Dhillon, et al., "Virtual network service endpoint policies for Azure Storage", Retrieved From https://github.com/MicrosoftDocs/azure-docs/blob/master/articles/virtual-network/virtual-network-service-endpoint-policies-overview.md, Feb. 21, 2020, 7 Pages.

Ellingwood, Justin, "Comparing Kubernetes CNI Providers: Flannel, Calico, Canal, and Weave", Retrieved From https://rancher.com/blog/2019/2019-03-21-comparing-kubernetes-cni-providers-flannel-calico-canal-and-weave/, Mar. 21, 2019, 11 Pages.

Foley, Mary Jo, "Microsoft's Project Sonar: Malware Detonation as a Service", Retrieved From https://www.zdnet.com/article/microsofts-project-sonar-malware-detonation-as-a-service/, Aug. 31, 2015, 6 Pages.

Howard, et al., "moby/moby", Retrieved From https://github.com/moby/moby/blob/master/oci/defaults.go#L14-L30, Nov. 14, 2019, 5 Pages.

Kerrisk, Michael, "Capabilities—overview of Linux Capabilities", Retrieved From https://man7.org/linux/man-pages/man7/capabilities.7.html, Nov. 1, 2020, 24 Pages.

Zhu, et al., "Freeflow", Retrieved From https://web.archive.org/web/20201125121519/https://github.com/microsoft/Freeflow, Nov. 25, 2020, 6 Pages.

"International Search Report and Written Opinion Issued in PCT Application No. PCT/US22/020667", Mailed Date: Jun. 28, 2022, 10 Pages.

Communication pursuant to Article 71(3) EPC, Received for European Application No. 22715438.2, mailed on Jul. 8, 2024, 05 pages.

\* cited by examiner

CONTROLLED DATA ACCESS VIA CONTAINER VISIBLE LOCATION

BACKGROUND

Computing systems operate in response to the execution of computer-executable instructions or "code". Code is often subject to a compliance review to eliminate potential code defects, security concerns and data abuse issues. Data is also often subject to a compliance review to ensure it comes from a reliable source, has not been tampered with or improperly edited. An entity often defines what a sufficient compliance review for code and data. Code that has not yet passed an entity's compliance review is often termed "untrusted code" for that entity. Code that has passed an entity's compliance review is often termed "trusted code" for that entity. Likewise, data that has not yet passed an entity's compliance review is often termed "untrusted data" for that entity, while data that has passed an entity's compliance review is often termed "trusted data" for that entity.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to a host computing system that runs a security component and a container such that code running within the container cannot access data and resources running on the host computing system except through one or more predetermined locations that are visible from within the container. As an example, that predetermined location could be a container file system—a file system that is visible to code running within the container. Thus, even untrusted code (code that has not passed a compliance review process designated by an entity) can be safely run on a host computing system of that entity.

The security component helps provide this safety by facilitating input of input data to the container, and by facilitating output of output data from the container. To facilitate the input to the container, the security component checks whether code running within the container is authorized to have access to the input data, and if so, provides the input data into one or more predetermined input locations visible to the container (e.g., one or more folders of the container file system). To facilitate the output from the container, the security component reads the output data from one or more predetermined output locations visible to the container (e.g., one or more folders of the container file system), performs one or more security checks on the output data, and if the output data passes the one or more security checks, provides the output data external to the container.

Such containers and host security components may similarly operate on multiple host computing systems. An overlay network may be present over multiple of such containers to thereby allow the code within containers to communicate with each other, even if the code is running on different computing systems, so long as the code is running within the overlay network. The overlay network permits communication while still allowing the safe communication of data to and from each container.

Thus, network workloads can be emulated while keeping their respective host computing systems safe. Accordingly, code does not have to be subject to compliance review each time a small change is made. Instead, code that has more minor changes can still be used even though a compliance check has not been performed since that change. This makes the process of developing code much more efficient since time-consuming compliance checks may be performed with less frequency without sacrificing security.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to a host computing system that runs a security component and a container such that code running within the container cannot access data and resources running on the host computing system except through one or more predetermined locations that are visible from within the container. As an example, that predetermined location could be a container file system—a file system that is visible to code running within the container. Thus, even untrusted code (code that has not passed a compliance review process designated by an entity) can be safely run on a host computing system of that entity.

The security component helps provide this safety by facilitating input of input data to the container, and by facilitating output of output data from the container. To facilitate the input to the container, the security component checks whether code running within the container is authorized to have access to the input data, and if so, provides the input data into one or more predetermined input locations visible to the container (e.g., one or more folders of the container file system). To facilitate the output from the container, the security component reads the output data from one or more predetermined output locations visible to the container (e.g., one or more folders of the container file system), performs one or more security checks on the output data, and if the output data passes the one or more security checks, provides the output data external to the container.

Such containers and host security components may similarly operate on multiple host computing systems. An overlay network may be present over multiple of such containers to thereby allow the code within containers to communicate with each other, even if the code is running on different computing systems, so long as the code is running within the overlay network. The overlay network permits communication while still allowing the safe communication of data to and from each container. Accordingly, the principles described herein allow for more dangerous code to run within a container whilst still being able to communicate with other non-compliant code running within another container.

Thus, network workloads can be emulated while keeping their respective host computing systems safe. Accordingly, code does not have to be subject to compliance review each time a small change is made. Instead, code that has more minor changes can still be used even though a compliance check has not been performed since that change. This makes the process of developing code much more efficient since time-consuming compliance checks may be performed with less frequency without sacrificing security.

Figure 1:
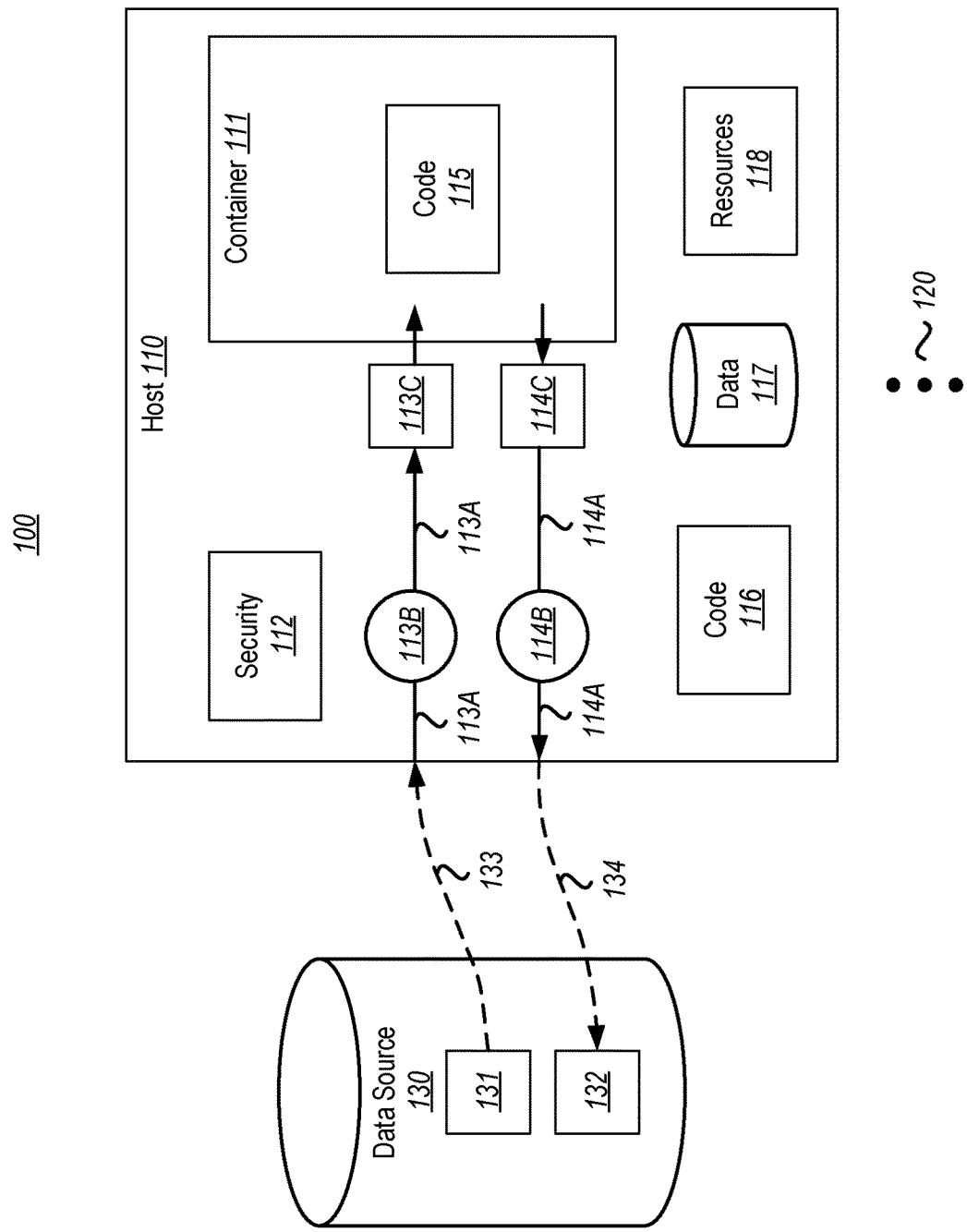
FIG. 1 illustrates a system in which the principles described herein may operate, and which includes a host computing system that runs a container having therein code, and in which a security component channels data to and from the container.

FIG. 1 illustrates a system 100 in which the principles described herein may operate. The system 100 includes one or more host computing system including the host computing system 110, amongst potentially other host computing systems as represented by the ellipsis 120. Although not required, in the illustrated embodiment, the system 100 also includes a data source 130. The host computing system 110 may be a virtual computing system (e.g., a virtual machine). In this case, the host computing system 110 emulates the behavior of a physical computing system, such as the computing system 600 described below with respect to FIG. 6. Alternatively, the host computing system 110 may be a physical computing system, such as the computing system 600 described below with respect to FIG. 6.

The host computing system 110 includes a container 111 and a security component 112. Code 115 runs within the container 111. However, the host computing system 110 also has code 116 running outside of the container 111. In addition, the host computing system 110 also has data 117 and other resources 118 external to the container 111. The container 111 is configured to prevent the internal code 115 having access to data (e.g., data 117) and resources (e.g., resources 118) on the host computing system except through one or more locations that are visible to the container. In one embodiment, the code 115 running inside the container 111 is non-compliant code that has not passed a set of compliance reviews that code 116 running outside of the container has passed. Accordingly, the container 111 protects the host computing system 110 from potential harm caused by non-compliant code.

The security component 112 facilitates input of data to the container 111 as represented by the arrow 113A, and facilitates output of data from the container 111 as represented by arrow 114A. In particular, the security component 112 provides appropriate input data 113B into one or more predetermined input locations 113C that are visible to the container 111. In addition, the security component 112 reads output data 114B that was placed into one or more predetermined output locations 114C, and if appropriate, provides that output data external to the container 111. Thus, the security component 112 has an opportunity to inspect the input data 113B prior to providing the input data to the container 111, and inspect the output data 114B prior to externally providing the output data from the container 111.

In one embodiment, the one or more predetermined input locations 113C are one or more folders within a file system that is visible to code (e.g., code 115) running within the container 111. Such a file system will be referred to herein as a "container file system." These one or more input folders may be read-only folders. Additionally, the one or more predetermined output locations 114C may also be one or more folders (also called herein "output folder") within the container file system. These one or more output folders may be read-write folders or perhaps even write-only folders.

Figure 3:
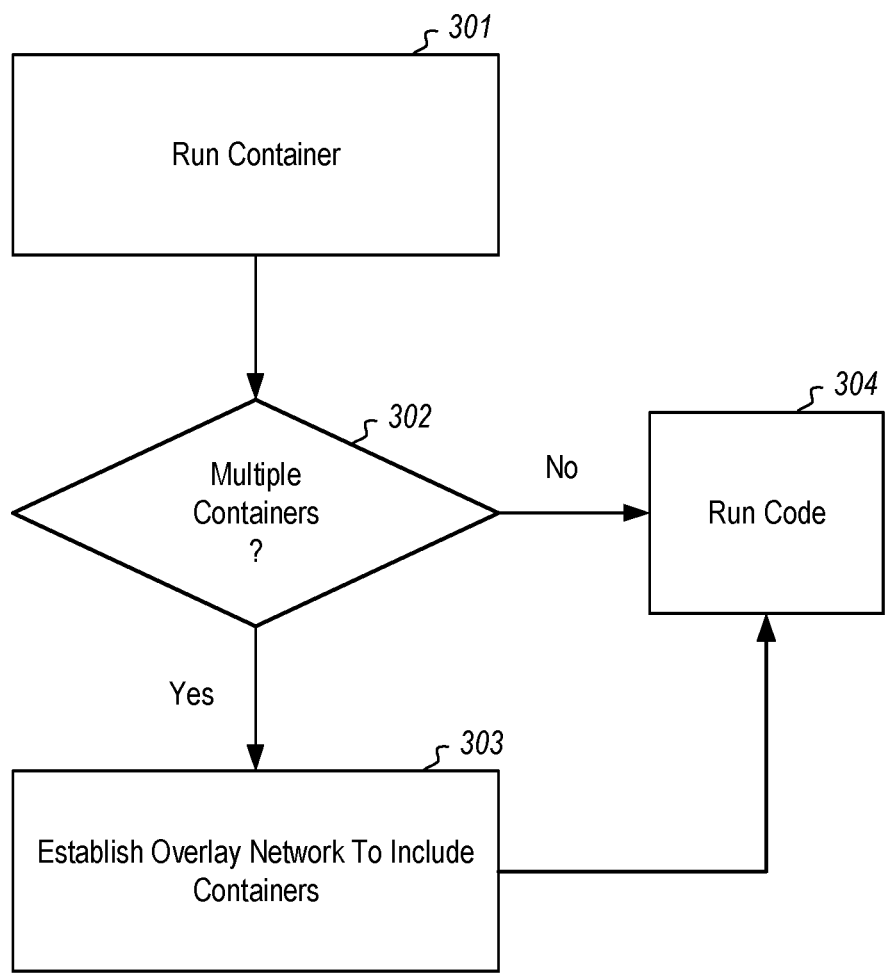
FIG. 3 illustrates a flowchart of a method for causing a container to run internal code, and represents how the host computing system creates an appropriate environment in which data is securely provided to and from the container.
Figure 4:
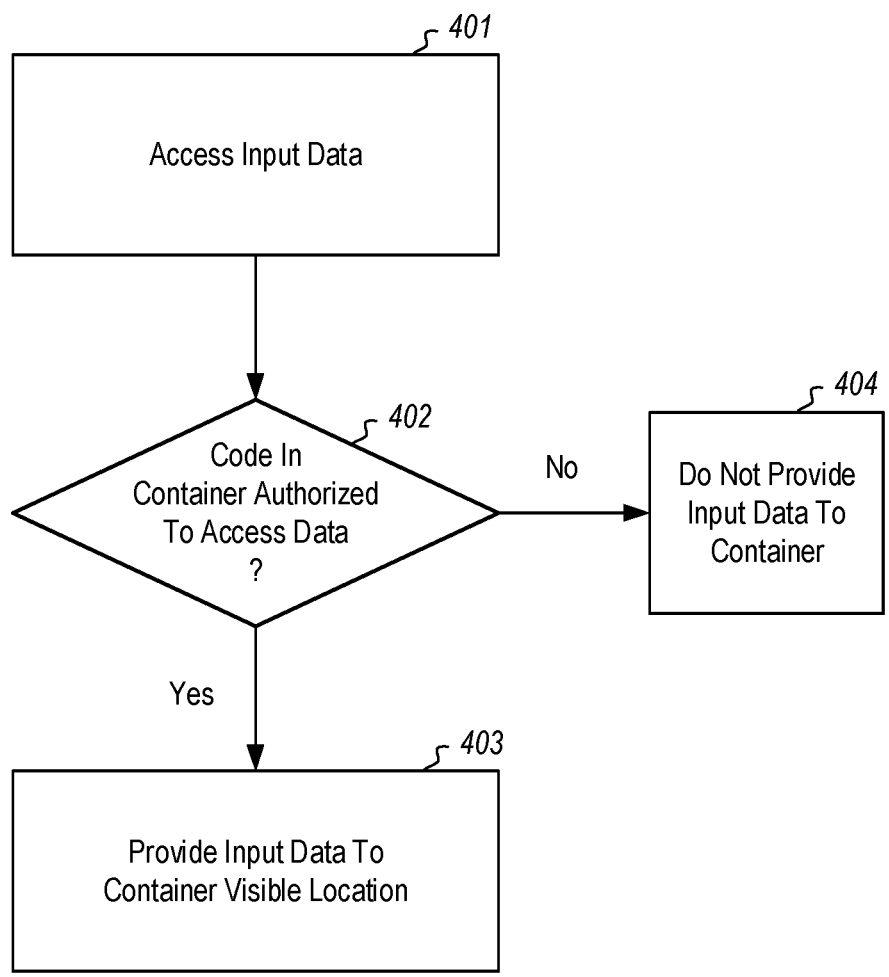
FIG. 4 illustrates a flowchart of a method for facilitating input of data to code running in a container running on a host computing system, in accordance with the principles described herein.
Figure 5:
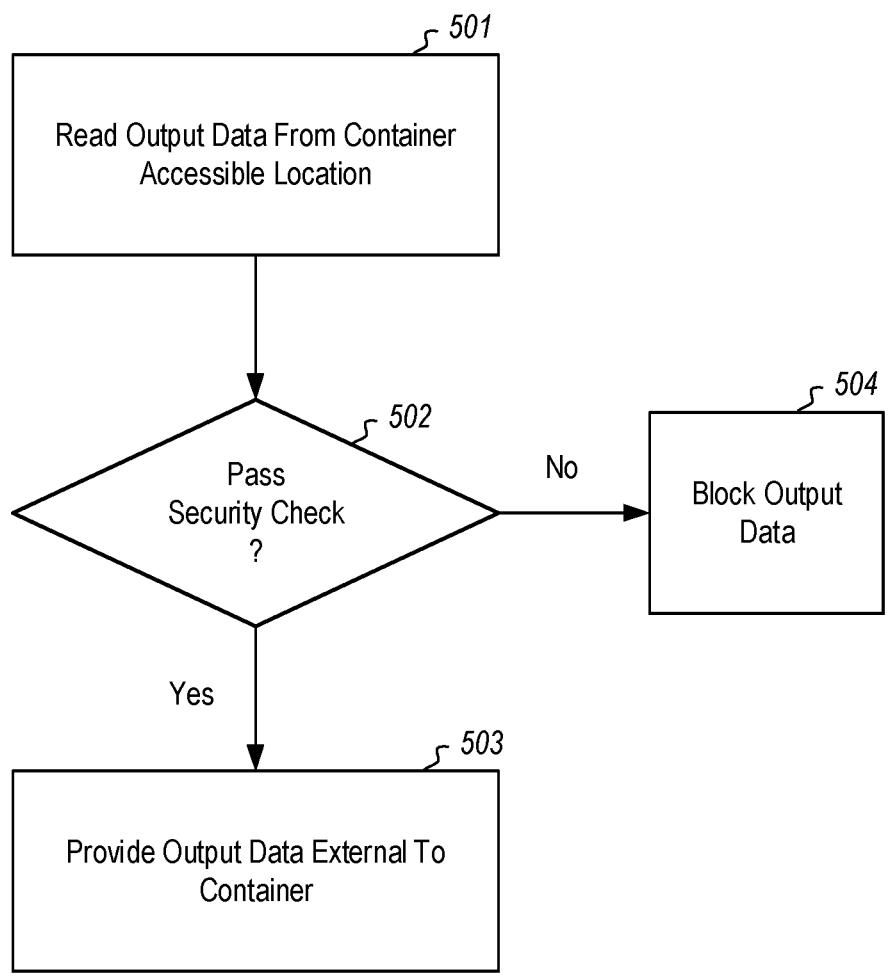
FIG. 5 illustrates a flowchart of a method for facilitating output of data from code running in a container running on a host computing system, in accordance with the principles described herein.

FIGS. 3 through 5 illustrate flowcharts of methods performed in conjunction with appropriately interfacing with the container hosted on the host computing system 110. FIG. 3 illustrates a flowchart of a method 300 for causing a container to run internal code, and represents how the host computing system creates an appropriate environment in which input data is securely provided to the container (as in FIG. 4), and in which output data is securely drawn from the container (as in FIG. 5). The methods of FIGS. 3 through 5 will each be described with frequent reference to the system 100 of FIG. 1.

The method 300 includes running a container on the host computing system (act 301). As an example, in FIG. 1, the host computing system 110 runs the container 111. If there are multiple containers that are to communicate one with each other, then the method 300 also includes determining whether there are multiple containers (decision block 302). In the illustrated case of FIG. 1, there is only one container within the system ("No" in decision block 302). In this case, the container runs the code internal to the container (act 304). If there had been multiple containers that are to communicate (as will be described with respect to the system 200 of FIG. 2) ("Yes" in decision block 302), then an overlay network is established to include all of the containers that are to communicate (act 303), and then the code is run within the container (act 304).

FIG. 4 illustrates a flowchart of a method 400 for facilitating input of data to code running in a container running on a host computing system, in accordance with the principles described herein. The method 400 may be performed in the context of the system 100 of FIG. 1. For example, arrow 113A represents an example of such input. Accordingly, the method 400 will now be described with frequent reference to the system 100 of FIG. 1 by way of example.

The method 400 includes accessing input data to be provided to code running inside the container (act 401). Referring to FIG. 1, the host computing system 110 accesses data 113B. In one embodiment, the security component 112 maps locations (e.g., location 131) within a data source (e.g., data source 130) as containing data that is pre-authorized for access within the container 111. In FIG. 1, the mapping between location 131 and the container 111 input path is represented by dashed-lined arrow 133. Thus, when data is placed within the location 131 of the data source 130, that data might automatically be accessed by the host computing system 110 to provide to the container 111. The data source 130 could be, for example, a network storage, a cloud storage, or a store service, or any other data source.

The security component then checks whether the code running within the container is authorized to have access to the input data (decision block 402). In one embodiment, the very fact that the data was found within the location 131 may be a sufficient assurance that the input data 113B is authorized for access within the container 111. Alternatively, or in addition, the security component 112 may follow rule-based and machine-learning based logic to determine whether access should be granted from within the container. The check could include verifying that the target code owns the data, where the data was generated and perhaps what generated the data, access privileges, whether the data is marked as sensitive, and so forth.

If the code is authorized to be provided to the container (Yes in decision block 402), the security component provides the input data into the predetermined input locations (act 403). As an example, in FIG. 1, the security component 112 provides the input data 113B into the input locations 113C, which can then be accessed by the code 115 within the container 111. For example, the input locations 113C may be one or more read-only folders in a container file system. On the other hand, if the code is not authorized to be provided to the container ("No" in decision block 402), the data is blocked from being provided to the container 111 (act 404).

FIG. 5 illustrates a flowchart of a method 500 for facilitating output of data from code running in a container running on a host computing system, in accordance with the principles described herein. The method 500 may be performed in the context of the system 100 of FIG. 1. For example, arrow 114A represents an example of such output. Accordingly, the method 500 will now be described with frequent reference to the system 100 of FIG. 1 by way of example.

The method 500 includes reading output data from one or more predetermined output locations (act 501). Referring to FIG. 1, the host computing system 110 reads the output data 114B from the output locations 114C. The security component then performs one or more checks on the output data to determine whether the output data satisfies those checks (decision block 502). If the output data passes the security checks ("Yes" in decision block 502), the security component allows the output data to be provided external to the container (act 504). As an example, in FIG. 1, the output data 114B is provided external to the container 111. Otherwise ("No" in decision block 502), the security component prevents or blocks the output data from being provided outside the container. An example of a check on such output data might include verifying that the data does not include an executable or instruction that could be executed by the host computing system.

In one embodiment, the security component 112 maps locations (e.g., location 132) within a data source (e.g., data source 130) as a target for providing any output data provided from the container. In FIG. 1, the mapping between location 132 and the container 111 output path is represented by dashed-lined arrow 134. Thus, when code within the container places data within the location 114C, the security component 112 may automatically perform a security check on that data, and if that data passes the security checks, provide that data to the location 132 of the data source 130.

Figure 2:
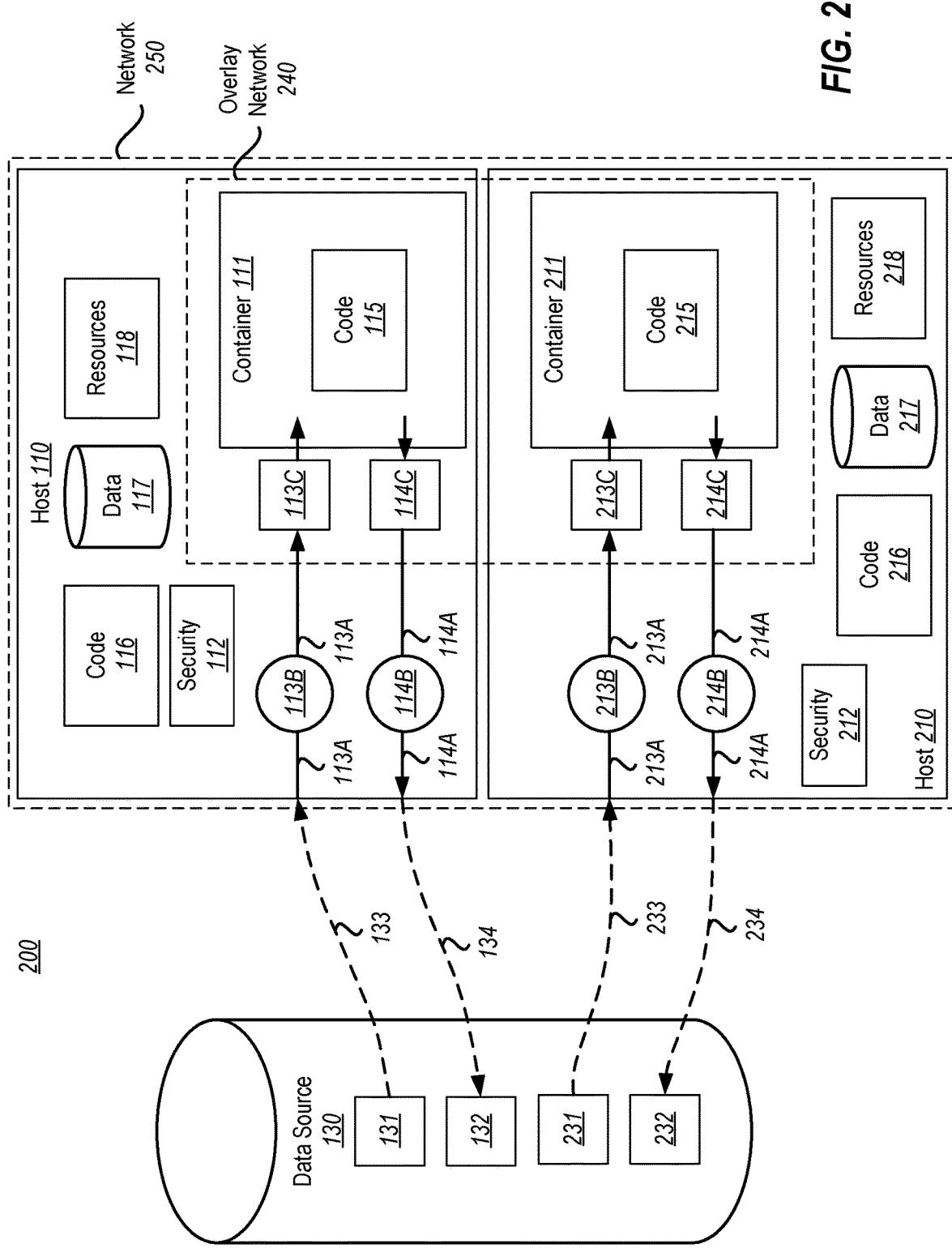
FIG. 2 illustrates a system that is similar to the system of FIG. 1 except there is shown multiple host computing systems in which code within respective containers can communicate via an overlay network.

FIG. 2 illustrates a system 200 that is similar to the system 100 of FIG. 1 in that it includes the host computing system 110, the data source 130, and the mappings 133 and 134. However, the system 200 also includes another host computing system 210. The second host computing system also includes a container 211, input locations 213C, output locations 214C, and security component 212, which may have similar functions as described for the respective container 111, input locations 113C, output locations 114C and security component 112 of FIG. 1.

That is, the container 211 operates to prevent code 215 running therein from harming the data 217 and resources 218 of the host computing system 210. Instead, the container 211 only can access data via the input location(s) 213C and provide data via the output location(s) 214C. The security component 212 likewise performs checks on the input data 213B and ensures secure providing of the pre-authorized data to the input location(s) 213C (as represented by arrow 213A), and the secure channeling of the output data 214B from the output location(s) 214C (as represented by arrow 214A). Furthermore, the code 215 may be code that has not complied with a compliance protocol whereas the code 216 running outside of the container 211 has complied with the compliance protocol. Also, the data source 130 includes an additional location 213 that maps (according to mapping 233) to the input channel 213A, and a location 232 that maps (according to mapping 234) to the output channel 214A.

In one embodiment, code 215 within the container 211 and code 115 within the container 111 are to communicate one with another. In this case, an overlay network 240 encompasses the first container 111 and the second container 211. This overlay network allows code within each container 111 and 211 to communicate with each other, notwithstanding their respective containers preventing them from being able to otherwise change the data or resources running on their respective host computing systems. The overlay network 240 may be a component that allows for code from one container to discover and address the code within the other container.

The overlay network ensures that when the code 115 provides data to the output location 114C that is addressed to the code 215, that this data will be received at the input location 213C for consuming by the code 215. Likewise, the overlay network ensures that when the code 215 provides data to the output location 214C that is addressed to the code 115, that this data will be received at the input location 113C for consuming by the code 115. There may likewise be three or more containers encompassed by an overlay network, and any of the code within these containers may communicate with the aid of the overlay network.

The overlay network 240 uses an actual network 250 that connects the host computing systems 110 and 210. For instance, if the host computing systems 110 and 210 were physical computing systems, the network 250 would be a physical network. If the host computing systems 110 and 210 were virtual computing systems (e.g., virtual machines), the network 250 would be a virtual network. Alternatively, the host computing systems could be a mix of virtual machine and physical computing system. For instance, host computing system 110 might be a virtual machine, whereas host computing system 210 might be a physical computing system, and vice versa.

Accordingly, the principles described herein allow for more dangerous code to run within a container whilst still being able to communicate with other non-compliant code running within another container. Thus, network workloads can be emulated while keeping their respective host computing systems safe. Accordingly, code does not have to be subject to compliance review each time a small change is made. Instead, code that has more minor changes can be permitted to be used, leaving compliance checks to be performed later. This makes the process of developing code much more efficient since time-consuming compliance checks may be performed with less frequency without sacrificing security.

Because the principles described herein are performed in the context of a computing system, some introductory discussion of a computing system will be described with respect to FIG. 6. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
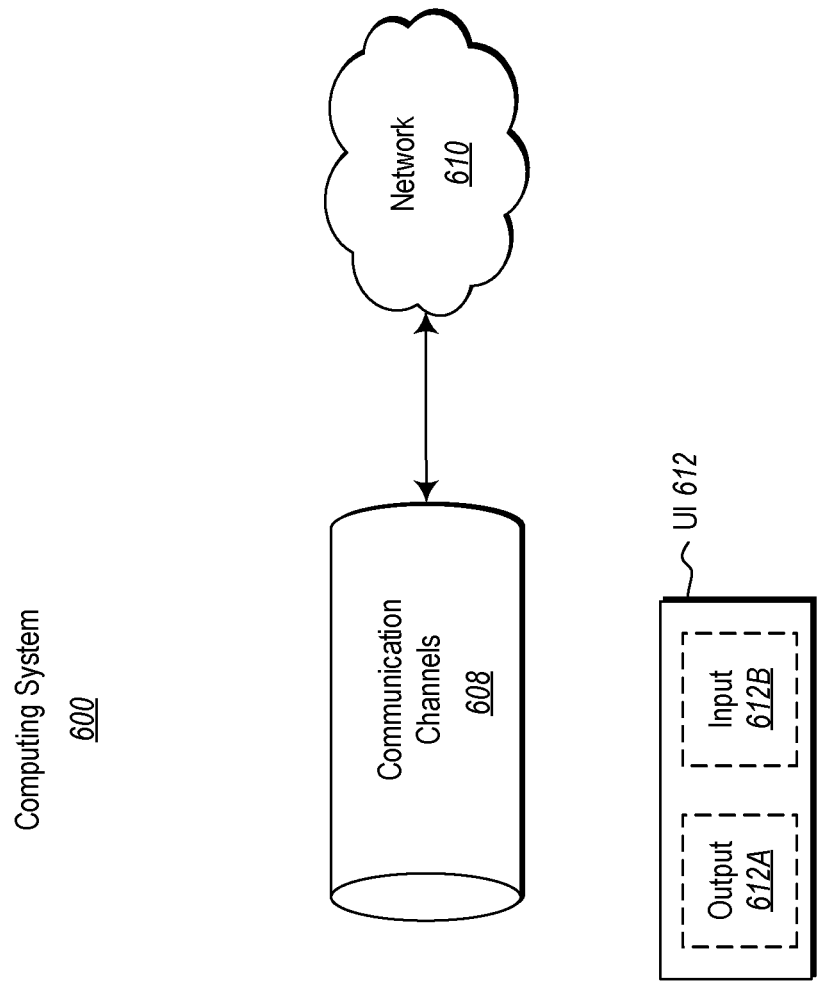
FIG. 6 illustrates an example computing system in which the principles described herein may be employed.

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A system comprising:
 a host computing system comprising one or more processors; and one or more computer-readable media having thereon computer-executable instructions that are structured such so as to configure the host computing system instantiate the following in response to the one or more processors executing the computer-executable instructions:
  a container configured to prevent access to data and resources on the host computing system except through one or more locations that are visible to the container; and
  a security component that is configured to do the following:
   facilitate input of input data to the container, the input data originating outside the container, by:
    mapping a location within a data source to contain data for access within the container, wherein when data is placed within the mapped location it is indicated to the security component as data which is intended to be provided within the container;

determining that the input data has been placed within the mapped location within the data source and intended to be provided within the container,
checking whether code contained within the container is authorized to have access to the input data,
performing a security check on the input data, and
when the input data passes the security check and the code contained within the container is authorized to have access to the input data, providing the input data into one or more predetermined input locations visible to the container; and
facilitate output of output data from the container by:
reading the output data from one or more predetermined output locations visible to the container,
performing one or more security checks on the output data, and
if the output data passes the one or more security checks, providing the output data external to the container.

2. The system in accordance with claim 1, the one or more predetermined input locations visible to the container being one or more input folders of a container file system.

3. The system in accordance with claim 2, one or more predetermined output locations visible to the container being one or more output folders of the container file system.

4. The system in accordance with claim 3, the one or more output folders of the container file system each being read-write, the one or more input folders of the container file system each being read-only.

5. The system in accordance with claim 3, the host computing system being a first host computing system, the container being a first container, the container file system being a first container file system, the security component being a first security component, the input data being first input data, the output data being first output data, the one or more processors being first one or more processors, the one or more computer-readable media being first one or more computer-readable media, the computer-executable instructions being first computer-executable instructions, the system further comprising:
a second host computing system comprising second one or more processors; and second one or more computer-readable media having thereon second computer-executable instructions that are structured such so as to configure the second host computing system instantiate the following in response to the second one or more processors executing the second computer-executable instructions:
a second container configured to prevent access to data and resources on the second host computing system except through a second container file system that is visible to the second container; and
a second security component that is configured to do the following:
facilitate input of second input data to the second container by
1) checking whether code contained within the second container is authorized to have access to the second input data, and
2) if the code contained within the second container is so authorized, providing the second input data into one or more input folders of the second container file system; and
facilitate output of second output data from the second container by
1) reading the second output data from one or more output folders of the second container file system, and
2) performing one or more security checks on the second output data, and
3) if the second output data passes the one or more security checks, providing the second output data external to the second container; and
an overlay network that encompasses the first and second container and that permits code within the first container and the second container to detect each other and communicate with each other.

6. The system in accordance with claim 5, the first and second host computing systems each being a respective physical computing system.

7. The system in accordance with claim 6, further comprising:
a physical network that the first and second host communication systems use to allow the first and second containers to communicate over the overlay network.

8. The system in accordance with claim 5, the first and second host computing systems each being a respective virtual machine.

9. The system in accordance with claim 8, further comprising:
a virtual network that the first and second host communication systems use to allow the first and second containers to communicate over the overlay network.

10. The system in accordance with claim 5, one of the first and second host computing systems being a physical computing system, and the other of the first and second host computing systems being a virtual machine.

11. The system in accordance with claim 1, code running inside the container being non-compliant code that has not passed a set of compliance reviews that code running outside of the container has passed.

12. The system in accordance with claim 1, the security component further configured to map locations of a data source to the host computing system, the locations including data that the container is pre-authorized to access.

13. A method for providing data to code within a container running on a host computing system, the method comprising:
instantiating a container on the host computing system, the container configured to prevent code running within the container from accessing to data and resources on the host computing system except through a container file system that is visible to the container;
running code within the container;
determining that input data to be provided to the code has been placed within the container;
accessing, by the host computing system, the input data to be provided to the code, the input data originating outside the container;
checking, by a security component running on the host computing system, whether the code running within the container is authorized to have access to the input data;
performing a security check on the input data; and when the input data passes the security check and the code contained within the container is authorized to have access to the input data, providing, by the security component, the input data into one or more input folders of the container file system; and the container configured to map locations of a data source as a target for providing output data provided from the container;

reading, by the host computing system, output data from one or more output folders of the container file system;

performing, by a security component running on the host computing system, one or more security checks on the output data; and when the output data passes the one or more security checks, providing, by the security component, the output data to a location of the data source external to the container.

14. The method in accordance with claim 13, the host computing system being a first host computing system, the container being a first container, the container file system being a first container file system, the security component being a first security component, the input data being first input data, the code being first code, the method further comprising:

running a second container on a second host computing system, the second container configured to prevent code running within the second container from accessing to data and resources on the second host computing system except through a second container file system that is visible to the second container;

running second code within the second container;

accessing, by the second host computing system, second input data to be provided to the code;

checking, by a second security component running on the second host computing system, whether the second code contained within the second container is authorized to have access to the second input data;

if the second code contained within the container is so authorized, providing, by the second security component, the second input data into second one or more input folders of the second container file system; and running an overlay network that permits the code running within the first and second containers to communicate with each other.

15. The method in accordance with claim 13, the one or more input folders of the container file system each being read-only.

16. The method in accordance with claim 13, the code running inside the container being non-compliant code that has not passed a set of compliance reviews that code running outside of the container has passed.

17. The method in accordance with claim 13, the host computing system being a first host computing system, the container being a first container, the container file system being a first container file system, the security component being a first security component, the output data being first output data, the code being first code, the method further comprising:

running a second container on a second host computing system, the second container configured to prevent code running within the second container from accessing to data and resources on the second host computing system except through a second container file system that is visible to the second container;

running second code within the second container;

reading, by the second host computing system, second output data from second one or more output folders of the second container file system;

performing, by a second security component running on the second host computing system, one or more security checks on the second output data; and if the output data passes the one or more security checks, providing, by the second security component, the second output data external to the second container.

18. The method in accordance with claim 13, the one or more output folders of the container file system each being read-write.

* * * * *